(12) United States Patent
Yamamoto

(10) Patent No.: US 10,088,648 B2
(45) Date of Patent: Oct. 2, 2018

(54) BINOCULARS

(71) Applicant: NIKON VISION CO., LTD., Shinagawa-ku, Tokyo (JP)

(72) Inventor: Mitsuo Yamamoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 150 days.

(21) Appl. No.: 14/389,312

(22) PCT Filed: Mar. 29, 2013

(86) PCT No.: PCT/JP2013/059584
§ 371 (c)(1),
(2) Date: Sep. 29, 2014

(87) PCT Pub. No.: WO2013/147180
PCT Pub. Date: Oct. 3, 2013

(65) Prior Publication Data
US 2015/0070759 A1      Mar. 12, 2015

(30) Foreign Application Priority Data

Mar. 29, 2012   (JP) ................................ 2012-078175

(51) Int. Cl.
*G02B 7/12*     (2006.01)
*G02B 23/18*    (2006.01)
*G02B 7/06*     (2006.01)

(52) U.S. Cl.
CPC ................. *G02B 7/12* (2013.01); *G02B 7/06* (2013.01); *G02B 23/18* (2013.01)

(58) Field of Classification Search
CPC . G02B 7/06; G02B 7/12; G02B 21/20–21/22; G02B 23/00–23/04; G02B 23/18; G02B 25/004; A61B 3/132
(Continued)

(56) References Cited

U.S. PATENT DOCUMENTS 4,428,651 A * 1/1984 Calcutt ................... G02B 7/06
359/418
5,305,141 A   4/1994 Hotta
(Continued)

FOREIGN PATENT DOCUMENTS

JP      50-120450 A    3/1975
JP      55-124019 A    2/1980
(Continued)

OTHER PUBLICATIONS

English translation of International Preliminary Report on Patentability from International Patent Application No. PCT/JP2013/059584, dated Oct. 9, 2014.
(Continued)

*Primary Examiner* — Kimberly N Kakalec
*Assistant Examiner* — James McGee
(74) *Attorney, Agent, or Firm* — Shapiro, Gabor and Rosenberger, PLLC

(57) ABSTRACT

Interpupillary distance of binoculars is adjusted by relatively rotating a pair of lens barrels about a predetermined axis. A click position setting mechanism sets a click position at an arbitrary angle of rotation of said pair of lens barrels and includes a rotating member rotatable about the predetermined axis. A lock/unlock member locks and unlocks the rotation of the rotating member.

9 Claims, 14 Drawing Sheets

(58) Field of Classification Search
USPC .................. 359/375–378, 404, 407–418, 473
See application file for complete search history.

(56) References Cited

U.S. PATENT DOCUMENTS

2009/0268284 A1* 10/2009 Yamamoto ........... G03B 17/565
                                                      359/401
2013/0083391 A1*  4/2013 Teetzel ................... G02B 23/18
                                                      359/409

FOREIGN PATENT DOCUMENTS

| JP | 8-262310 A    | 10/1996 |
|----|---------------|---------|
| JP | 11-14893 A    | 1/1999  |
| JP | 11-202383 A   | 7/1999  |
| JP | 2000-099178 A | 4/2000  |
| JP | 2002-372671 A | 12/2002 |
| JP | 2004-361693 A | 12/2004 |
| JP | 2010-256455 A | 11/2010 |

OTHER PUBLICATIONS

International Search Report from International Patent Application No. PCT/JP2013/059584, dated Jul. 9, 2013.
Office Action dated Feb. 1, 2016 in Chinese Patent Application No. 2013 8002 7815.2.
Office Action (Notification of Reasons for Refusal) dated Sep. 19, 2017, in Japanese Patent Application No. 2016-196469.

\* cited by examiner

BINOCULARS

TECHNICAL FIELD

The present invention relates to binoculars.

BACKGROUND ART

Japanese Patent Application Laid-Open Publication No. H11-14893 discloses horizontal movement type binoculars including: a click plate having a click portion provided in at least one part and being slidable in a direction orthogonal to a direction of an optical axis along a fixed body; an interpupillary distance click spring fitted to a movable body slidably movable in the direction orthogonal to the direction of the optical axis with respect to the fixed body and being capable of engaging with the click portion; and a lock mechanism being capable of locking and unlocking the click plate in an arbitrary position.

According to the conventional horizontal movement type binoculars, a position of the interpupillary distance at which a sense of clicking is obtained can be arbitrarily set and, besides, can be changed without canceling this set position.

PRIOR ART DOCUMENT

Patent Document

Patent document: Japanese Patent Application Laid-Open Publication No. H11-14893

SUMMARY OF THE INVENTION

Problems to be Solved by the Invention

However, the conventional binoculars adopt a structure disabling the click plate from being operated directly. Therefore, in order to set the click plate in an arbitrary position, a user has to locate the click plate in a desired position and to thus set the click position by engaging the interpupillary distance click spring with a recessed portion of the click plate while sliding the movable body in an unlocked state of the lock mechanism and moving the movable body in the way of bringing the click plate together. Accordingly, realization of such an operation entails severely adjusting frictions of the respective portions and spring force as well, and the adjustments thereof are hard to attain.

This point will be specifically described in conformity with an embodiment in Japanese Patent Application Laid-Open Publication No. H11-14893.

Japanese Patent Application Laid-Open Publication No. H11-14893 discloses a structure disabling a "click plate 21" provided with a "recessed portion 21a" from being directly operated as shown in FIG. 5 thereof, and discloses also a configuration that the "click plate 21" being held on an "upper base plate 17" and sliding in the direction orthogonal to the optical axis is sandwiched in between a "click spring 23" and the "upper base plate 17".

This structure causes an increase in friction of the "click plate 21" against the "click spring 23" because if the spring force of the "click spring 23" is strong and when a "movable body 15" is moved in an increasing direction of the interpupillary distance from an interpupillary distance accommodated state, i.e., a state of the "click plate 21" being in a minimum interpupillary distance position, the "click plate 21" is pressed against the "upper base plate 17" by the "click spring 23". On this occasion, the frictional force between the "click plate 21" and the "click spring 23" overcomes the frictional force between the "click plate 21" and the "upper base plate 17", in which case even when the "click spring 23" does not engage with the recessed portion 21a", it follows that the "click plate 21" moves together with the movement of the "click spring 23".

Whereas if the spring force of the "click spring 23" is made weak to such a degree that the "click plate 21" does not move together with the movement of the "click spring 23" and when force causing the"click spring 23" to run on the "recessed portion 21a" is inferior to the frictional force between the "click plate 21" and the "upper base plate 17" after the "click spring 23" drops in the "recessed portion 21a" of the "click plate 21", it follows that the "click plate 21" does not move irrespective of the movement of the "click spring 23" even though the "click spring 23" engages with the "recessed portion 21a".

Thus, if the frictional force among the respective portions and the spring force of the "click spring 23" are not severely adjusted, it is impossible to drop the "click spring 23" in the "recessed portion 21a" of the "click plate 21" by moving the "movable body 15" in the increasing direction of the interpupillary distance and thereafter to move the "click spring 23" in the way of bringing the "click plate 21" together. Namely, Japanese Patent Application Laid-Open Publication No. H11-14893 has difficulty to adjust the frictions among the respective portions and the spring force in order to perform an objective operation.

The present invention is made in view of such circumstances and aims at providing binoculars capable of arbitrarily setting a position of an interpupillary distance at which a sense of clicking can be obtained, changing the position of the interpupillary distance without canceling the set position and, besides, eliminating a necessity for severe adjustments of the respective portions for causing desired operations.

Means for Solving the Problems

To solve the problems given above, the present invention provides binoculars that includes: a pair of lens barrels each having a telescopic optical system; and interconnecting portion interconnecting the pair of lens barrels so as to be relatively rotatable about an axis of an axial member that is parallel to an optical axis of each of the telescopic optical systems, an interpupillary distance being adjusted by relatively rotating the pair of lens barrels about the axial member, the binoculars including: (a) a click position setting mechanism serving to set a click position at a predetermined angle of rotation of the pair of lens barrels, the click position setting mechanism being configured to include: a rotating member being provided on the axial member so as to be rotatable about the axis of the axial member and facing the interconnecting portion in a direction of the axis of the axial member; a protruded portion being provided on any one of the interconnecting portion and the rotating member; and a recessed portion being provided on the other of the interconnecting portion and the rotating member and being capable of engaging with the protruded portion; and (b) a lock/unlock member locking the rotation of the rotating member with respect to the axial member and unlocking the locked rotation thereof.

In the binoculars according to a preferable aspect of the present invention, a plurality of click positions are provided.

In the binoculars according to another preferable aspect of the present invention, at least one click position of the plurality of click positions is different in terms of a sense of clicking from other click positions.

In the binoculars according to still another preferable aspect of the present invention, the protruded portion protrudes in an axial direction of the axial member.

In the binoculars according to yet another preferable aspect of the present invention, the protruded portion is configured by a ball biased in a direction of the protrusion by an elastic member.

In the binoculars according to a further preferable aspect of the present invention, the lock/unlock member is a member screwed to the axial member, locking the rotation of the rotating member by fastening the rotating member in the axial direction of the axial member through making a rotation in a predetermined direction, and unlocking the locked rotation of the rotating member by slackening the fastened rotating member through making the rotation in a reversed direction.

The binoculars according to a still further preferable aspect of the present invention further include a member screwed to the axial member and having a portion positioned on a side opposite to the rotating member with respect to the lock/unlock member.

In the binoculars according to a yet further preferable aspect of the present invention, the lock/unlock member serves also as a decorative cover that covers one side of the rotating member in the axial direction.

Effect of the Invention

According to the present invention, it is feasible to provide the binoculars capable of arbitrarily setting the position of the interpupillary distance at which the sense of clicking can be obtained, changing the position of the interpupillary distance without canceling the set position and, besides, eliminating the necessity for the severe adjustments of the respective portions for causing the desired operations.

EMBODIMENTS FOR CARRYING OUT THE INVENTION

Binoculars according to the present invention will hereinafter be described with reference to the drawings.

First Embodiment

Figure 1:
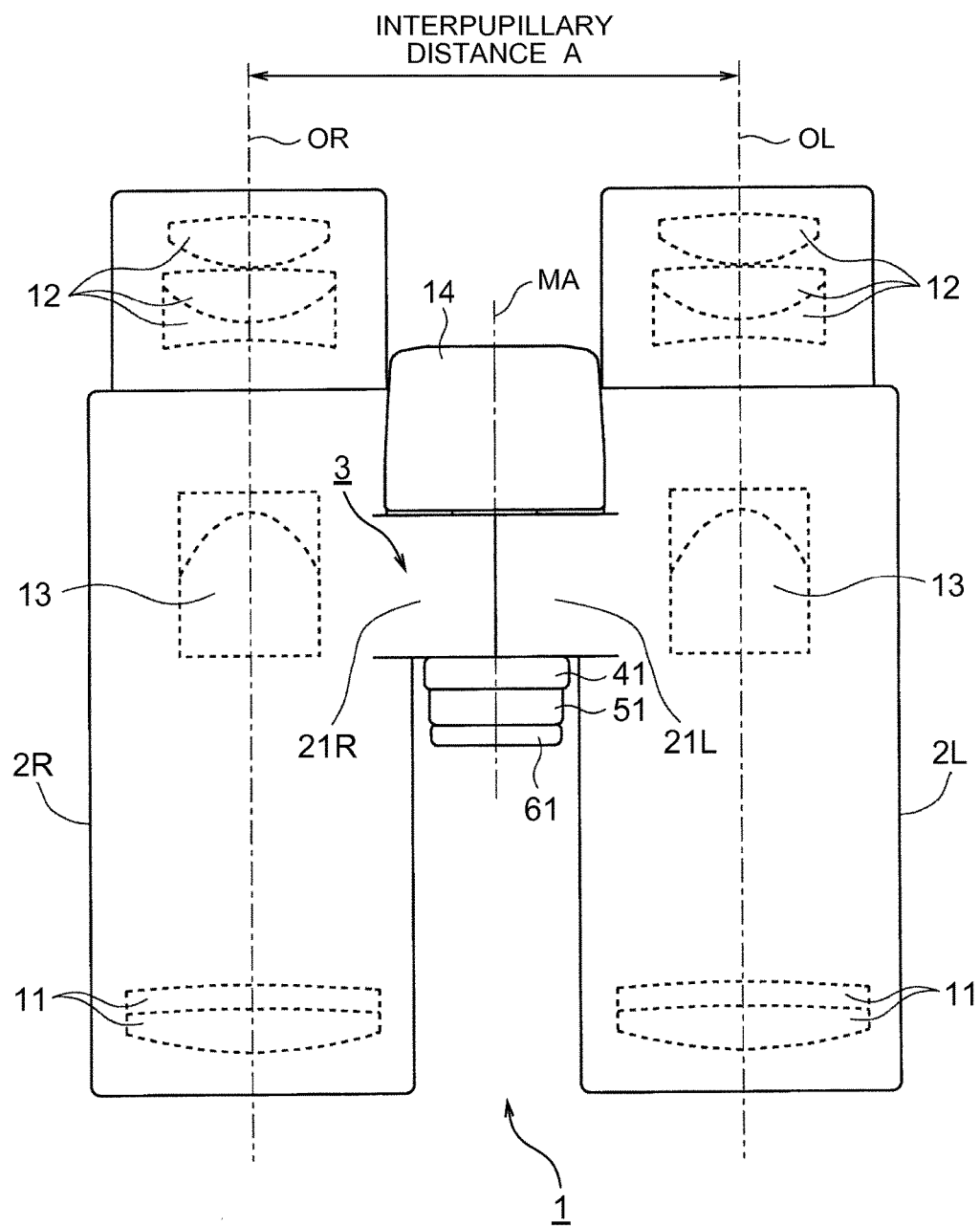
FIG. 1 is a schematic plan view showing binoculars according to a first embodiment of the present invention.
Figure 2:
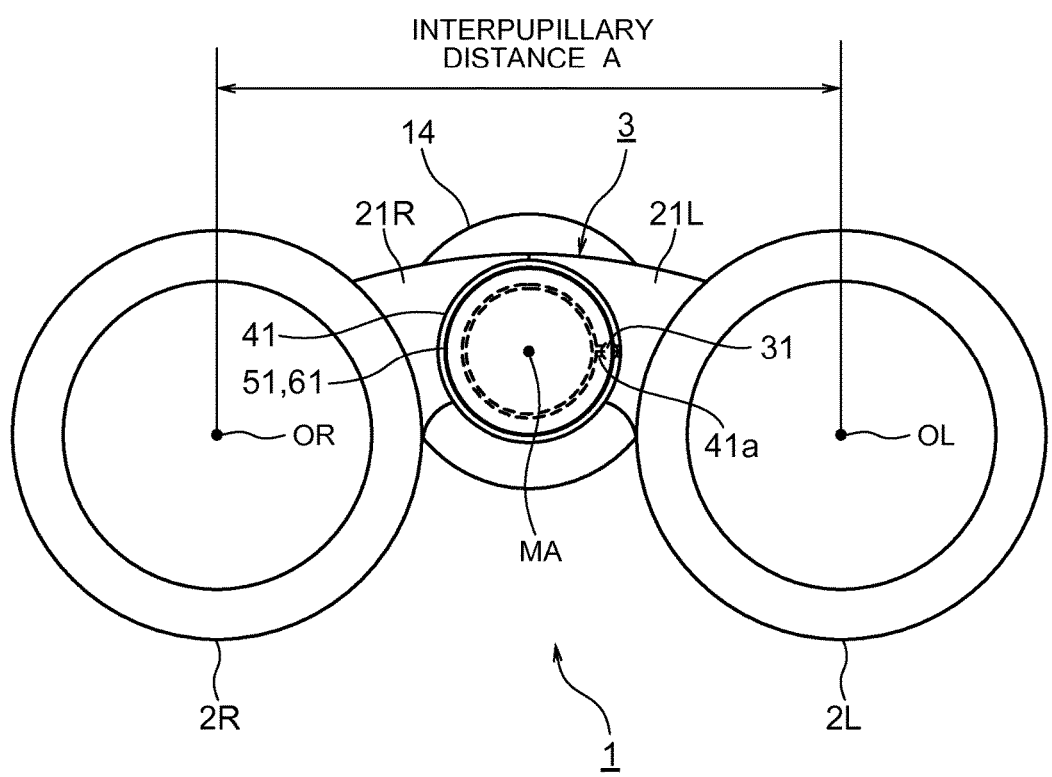
FIG. 2 is a schematic front view showing the binoculars illustrated in FIG. 1.
Figure 3:
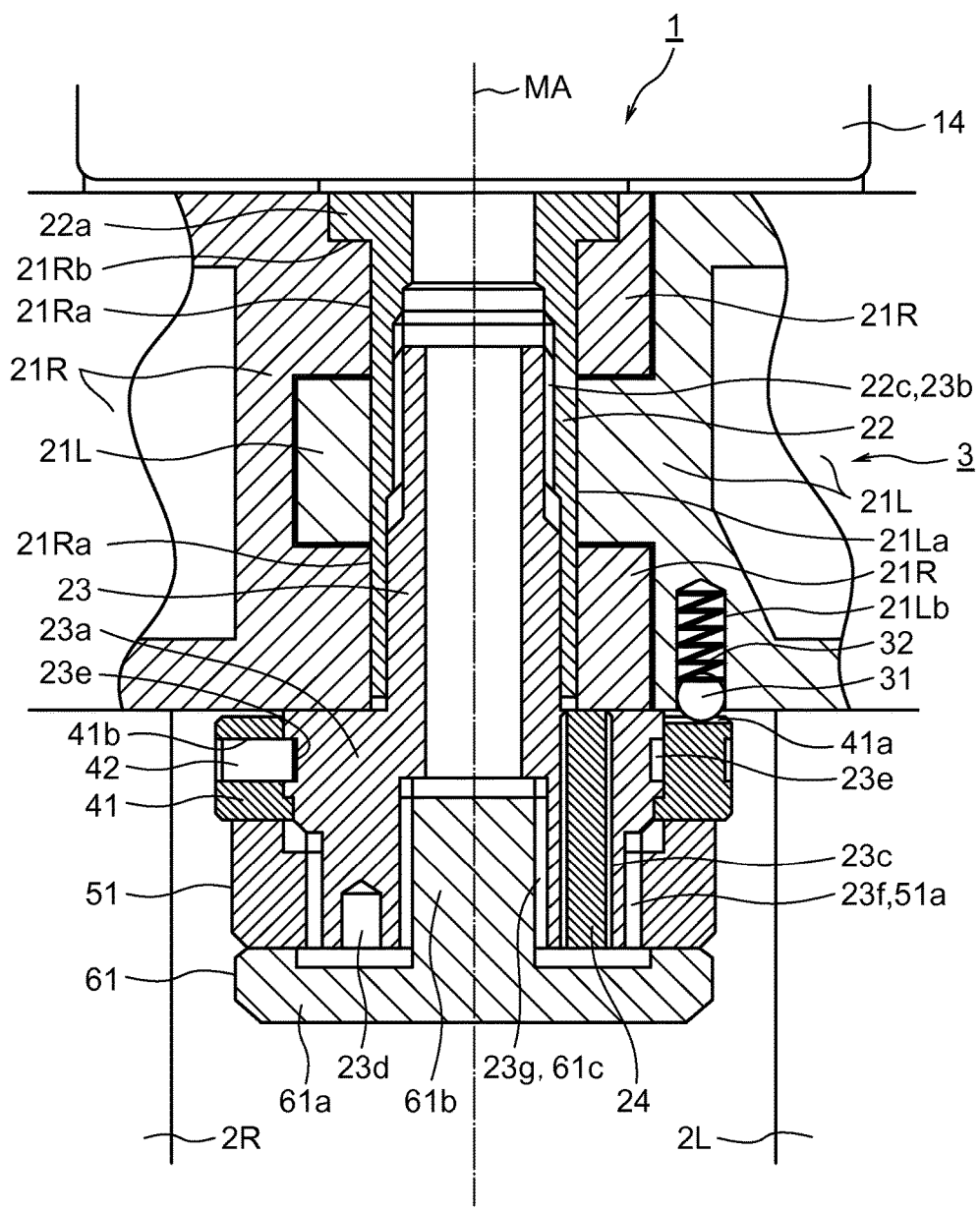
FIG. 3 is a view of portions in the vicinity of an axis MA in FIG. 1, with these portions being illustrated in enlargement and the majority thereof being illustrated as being broken.
Figure 4:
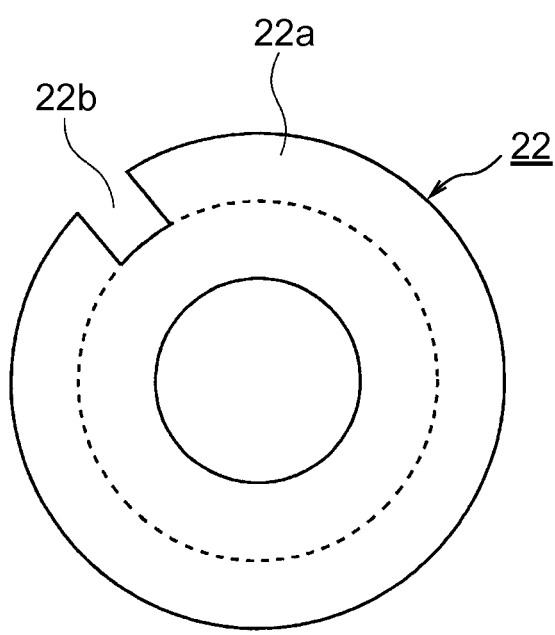
FIG. 4 is a view of a first axial member in FIG. 3 as viewed in a direction of the axis MA from a side of an eyepiece.

FIG. 1 is schematic plan view showing binoculars 1 according to a first embodiment of the present invention. FIG. 2 is a schematic front view showing the binoculars 1 illustrated in FIG. 1. FIGS. 1 and 2 depict a state where an interpupillary distance is adjusted to a maximum interpupillary distance A. FIG. 3 is a view of portions in the vicinity of an axis MA in FIG. 1, with these portions being illustrated in enlargement and the majority thereof being illustrated as being broken. FIG. 4 is a view of a first axial member 22 in FIG. 3 as viewed in a direction of the axis MA from a side of an eyepiece 12. FIG. 4 depicts only the first axial member 22.

The binoculars 1 according to the first embodiment of the present invention include: a pair of right and left lens barrels 2R, 2L each incorporating a telescopic optical system; and an interconnecting unit 3 to interconnect these two lens barrels 2R, 2L in the way of being relatively rotatable about the axis MA parallel to optical axes OR, OL thereof, a configuration being such that the interpupillary distance is adjusted by relatively rotating the lens barrels 2R, 2L about the axis MA. As shown in FIG. 1, the axis MA is positioned between the optical axes OR, OL as viewed on plane.

Each of the lens barrels 2R, 2L includes an objective lens 11, an eyepiece 12 and an erecting prism 13 disposed in an optical path between the objective lens 11 and the eyepiece 12, these lens elements configuring the telescopic optical systems. A focus knob 14 for focusing of each telescopic optical system is provided on the side of the eyepiece 12 in the direction of the axis MA of the interconnecting unit 3.

The interconnecting unit 3 includes: an interconnecting member 21R serving as an arm unit provided integrally with the lens barrel 2R; an interconnecting member 21L serving as an arm unit provided integrally with the lens barrel 2L; a first cylindrical axial member 22 having a flange portion 22a; and a second cylindrical axial member 23 having a flange portion 23a being large in wall thickness.

In the first embodiment, the interconnecting member 21R is connected to the interconnecting member 21L via the first and second axial members 22, 23 each being coaxial with the axis MA so that the interconnecting members 21R, 21L can relatively rotate about the axis MA. The interconnecting members 21R, 21L are formed with holes 21Ra, 21La each extending in the direction of the axis MA. The hole 21Ra of the interconnecting member 21R and the hole 21La of the interconnecting member 21L are disposed in a side-by-side relationship coaxially with the axis MA, and receive, as will be described later on, insertions of the first and second axial members 22, 23 being screwed to each other. As will be described later on, the first and second axial members 22, 23 are fixed integrally with the interconnecting member 21R.

On the other hand, the interconnecting member 21L is supported rotatably on the first axial member 22 inserted into the hole 21La thereof and is thereby rotatable about the first and second axial members 22, 23. This configuration being thus made, the interconnecting members 21R, 21L can relatively rotate about the axis MA.

In the following description, for the explanatory convenience, a direction on the side of the eyepiece 12, i.e., the direction toward the eyepiece 12 in the direction of the axis MA is referred to as an upper side or an upward direction in FIG. 3, while a direction on the side of the objective lens 11, i.e., the direction toward the objective lens 11 in the direction of the axis MA is referred to as a lower side or a downward direction in FIG. 3 as the case may be.

The first axial member 22 is inserted into the holes 21Ra, 21La of the interconnecting members 21R, 21L in the side-by-side relationship on the axis MA from the upper side in FIG. 3, with its flange portion 22a being directed on the upper side in FIG. 3. An upper portion of the hole 21Ra in FIG. 3 is configured with its diameter being expanded in a shape capable of receiving just the flange portion 22a, and a lower surface of the flange portion 22a in FIG. 3 abuts on an abutment surface 21Rb of the interconnecting member 21R, thereby regulating a downward movement of the first axial member 22 in FIG. 3 with respect to the interconnecting member 21R. As shown in FIG. 4, the flange portion 22a of the first axial member 22 is formed with a notch 22b. A protrusion (not shown) of the interconnecting member 21R fits in this notch 22b, thereby regulating a rotation of the first axial member 22 about the axis MA with respect to the interconnecting member 21R.

The second axial member 23 is inserted into the first axial member 22 from the lower side in FIG. 3, with its flange portion 23a being directed on the lower side in FIG. 3. A male thread portion 23b formed along an outer periphery of the upper portion of the second axial member 23 in FIG. 3, is screwed into a female thread portion 22c formed along an inner periphery of the first axial member 22, and an upper surface of the flange portion 23a of the second axial member 23 in FIG. 3 abuts on an end surface of the interconnecting member 21R on the side of the objective lens 11 in the direction of the main axis MA. With this abutment, the flange portion 22a of the first axial member 22 and the flange portion 23a of the second axial member 23 pinch the interconnecting member 21R respectively from upward and downward in FIG. 3, thereby regulating the movements of the second axial member 23 with respect to the first axial member 22 and further the interconnecting member 21R in the upper and lower directions in FIG. 3.

The flange portion 23a of the second axial member 23 is formed with a screw hole 23c through the flange portion 23a in the direction of the axis MA. A screw 24 is screwed into the screw hole 23c, and an upper end of the screw 24 in FIG. 3 is pressed against an end surface of the interconnecting member 21R on the side of the objective lens 11 in the direction of the axis MA. This configuration regulates the rotation of the second axial member 23 about the axis MA with respect to the interconnecting member 21R and the first axial member 22, and inhibits a screw-engagement between the male thread portion 23b formed along the outer periphery of the second axial member 23 and the female thread portion 22c formed along the inner periphery of the first axial member 22 from slackening. Note that the second axial member 23 is formed with a hole 23d capable of receiving an insertion of a tool (unillustrated) for making the screw-engagement of the second axial member 23.

Based on what is configured so far, the first axial member 22 and the second axial member 23 are fixed integrally with the interconnecting member 21R.

The interconnecting member 21L is, as described above, rotatable with respect to the first axial member 22 and the second axial member 23. By dint of the screw-engagement between the first axial member 22 and the second axial member 23, the interconnecting member 21L is pressed, via a washer (unillustrated), against the interconnecting member 21R in the direction of the main axis MA, resulting in occurrence of a predetermined magnitude of frictional force among the interconnecting member 21R, the washer and the interconnecting member 21L. This frictional force has the magnitude being large enough to overcome weights of the right and left lens barrels 2R, 2L, to enable an angle made by the right and left lens barrels 2R, 2L to be set to an arbitrary value, i.e., enable these right and left lens barrels 2R, 2L to be held at an arbitrary interpupillary distance, and to enable the right and left lens barrels 2R, 2L to rotate relatively about the axis MA by applying a predetermined magnitude of external force to the lens barrels 2R, 2L. Accordingly, the interpupillary distance can be adjusted by relatively rotating the right and left lens barrels 2R, 2L about the axis MA.

Then, the binoculars 1 according to the first embodiment further include: a ball 31 being provided on one lens barrel 2L and serving as a protrusion for clicking; an operation member 41 being rotatable about the axis MA through a rotating operation and having a V-shaped groove 41a engaging with the ball 31 and serving as one recessed portion for clicking, the operation member 41 setting a click position corresponding to a rotating position; a lock/unlock member 51 to lock the rotation and unlock the locked rotation of the operation member 41 with respect to the other lens barrel 2R in a way that corresponds to the operation; and a decorative cover 61.

Figure 5:
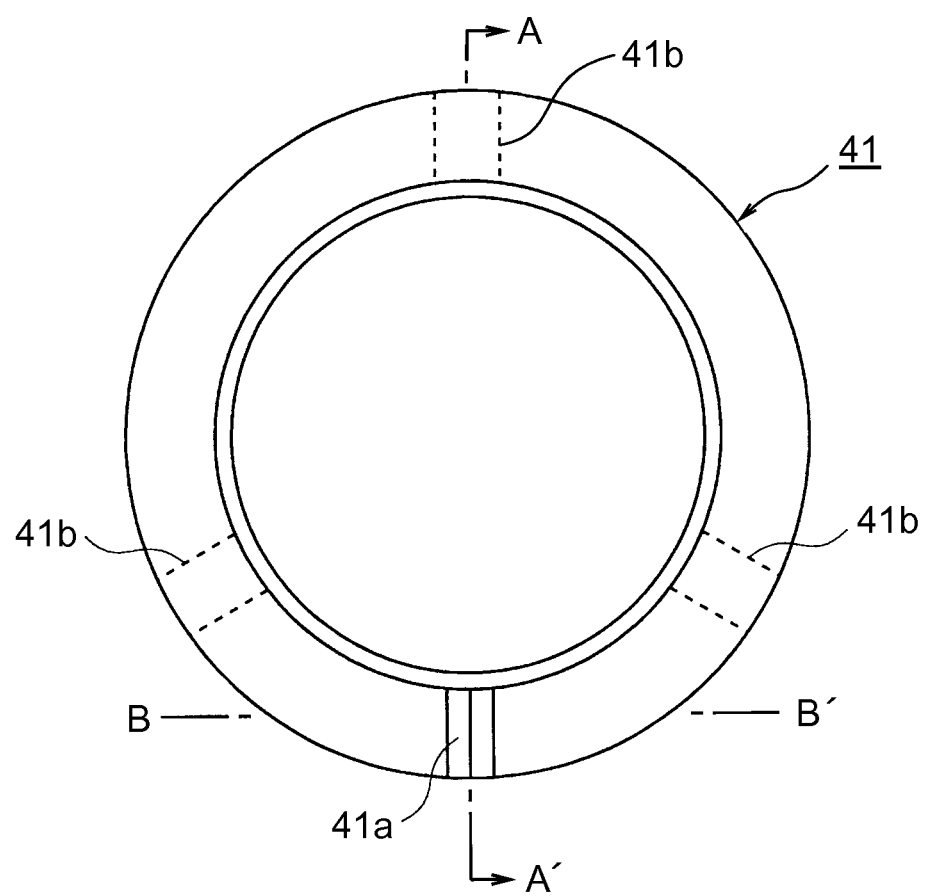
FIG. 5 is a plan view showing an operation member in FIGS. 1 to 3.
Figure 6:
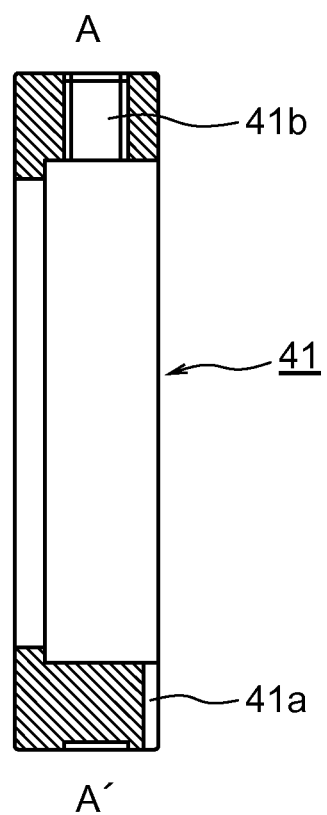
FIG. 6 is a sectional view taken along the arrow line A-A' in FIG. 5.
Figure 7:
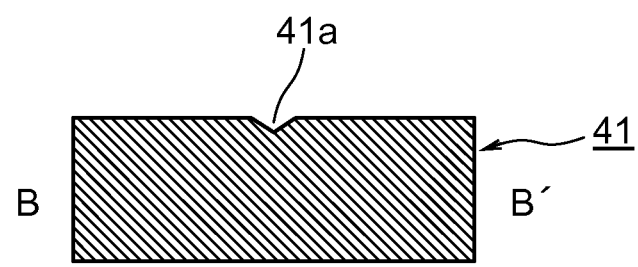
FIG. 7 is a sectional view taken along the line B-B' in FIG. 5.

FIG. 5 is a plan view showing the operation member 41 in FIGS. 1 to 3. Namely, FIG. 5 is the view of the operation member 41 as viewed in the direction of the axis MA from the upper side in FIG. 3. FIG. 6 is a sectional view taken along the arrow line A-A' in FIG. 5. FIG. 7 is a sectional view taken along the line B-B' in FIG. 5.

In the first embodiment, the operation member 41 is configured as an annular member. A one-sided surface (an upper surface in FIG. 3) of the operation member 41 in the axial direction is formed with a radially-extended V-shaped groove, i.e., the groove 41a taking the V shape in section as one recessed portion for clicking. As a matter of course, the recessed portion for clicking is, if capable of a click engagement, not limited to the V-shaped groove. Further, the operation member 41 is formed with a plurality of through-holes 41b passing through between the inner periphery and the outer periphery in order to be provided with pins 42 that will be mentioned below.

The operation member 41 is fitted, with a surface formed with the V-shaped groove 41a being directed on the upper side in FIG. 3, on the outer periphery of the flange portion 23a of the second axial member 23, and is thus supported on the flange portion 23a so as to be freely rotatable about the axis MA. An engagement groove 23e is formed over an entire length of the outer periphery of the flange portion 23a. The pins 42 are press-fitted into the through-holes 41b of the operation member 41 so as to protrude on the side of the inner periphery of the operation member 41. This pin 42 engages with the engagement groove 23e of the flange portion 23a of the second axial member 23, thereby regulating a movement of the operation member 41 in the direction of the axis MA with respect to flange portion 23a. With this configuration, the operation member 41 becomes rotatable about the axis MA with respect to the second axial member 23 in a state of facing the interconnecting member 21R with a slight gap in the direction of the axis MA. An outer periphery of the operation member 41 is exposed to the outside, and a user performs a rotating operation to apply rotating force acting about the axis MA to the outer periphery of the operation member 41, whereby the operation member 41 can be rotated about the axis MA.

The ball 31 serving as the protrusion for clicking to engage with the V-shaped groove 41a of the operation member 41, is disposed in a position enabling a face-to-face relationship with the V-shaped groove 41a of the operation member 41 through the rotation of the operation member 41. This ball 31 is biased toward the downward direction in FIG. 3 by a compression spring 32 accommodated in a hole 21Lb extending in the direction of the axis MA, the hole being formed with an opening in a lower-sided surface of the interconnecting member 21L in FIG. 3, i.e., the surface facing the operation member 41. Most of the ball 31 is also accommodated in the hole 21Lb. With this arrangement, the ball 31 is provided on the side of the interconnecting member 21L and, though movable in the direction of the axis MA with respect to the interconnecting member 21L, rotates about the axis MA together with the interconnecting member 21L. When the ball 31 faces the V-shaped groove 41a of the operation member 41 corresponding to the rotating position about the axis MA of the operation member 41 relative to the interconnecting member 21L, the ball 31 drops into the V-shaped groove 41a of the operation member 41, thus attaining a click-engagement. FIGS. 2 and 3 illustrate a state where the ball 31 click-engages with the V-shaped groove 41a. Whereas when the ball 31 does not face the V-shaped groove 41a of the operation member 41 corresponding to the rotating position about the axis MA of the operation member 41 relative to the interconnecting member 21L, the ball 31 is freed from the click-engagement with the V-shaped groove 41a and runs on the upper surface of the operation member 41 in FIG. 3. Note that the protrusion for clicking may involve, without being limited to the ball 31 biased by the compression spring 32, using a protrusion provided on a plate spring.

In the first embodiment, the lock/unlock member 51 is configured as an annular member and is disposed coaxially with the operation member 41 on the lower side of the operation member 41 in FIG. 3. A female thread portion 51a formed along the inner periphery of the lock/unlock member 51 is screwed to a male thread portion 23f formed along the outer periphery of the flange portion 23a of the second axial member 23. The outer periphery of the lock/unlock member 51 is exposed to the outside, and the user can rotate the lock/unlock member 51 in a predetermined direction and in a reversed direction about the axis MA by performing the rotating operation through applying the rotating force acting about the axis MA to the outer periphery of the lock/unlock member 51. With this operation, the lock/unlock member 51, upon being rotated in the predetermined direction about the axis MA, locks the rotation of the operation member 41 by fastening the operation member 41 in the direction of the axis MA, herein, in the upward direction in FIG. 3, and thus the lock/unlock member 51 disables the operation member 41 from rotating; and the lock/unlock member 51, upon being rotated in the reversed direction, unlocks the rotation of the operation member 41 by slackening the fastened operation member 41, and thus the lock/unlock member 51 enables the operation member 41 to rotate. As a matter of course, the first embodiment may adopt a member(s) based on some other lock mechanisms by way of a lock/unlock member in place of the lock/unlock member 51.

In the first embodiment, the decorative cover 61 includes a disc-like cover portion 61a and a shaft portion 61b being protruded at the center of the cover portion 61a. A male thread portion 61c formed along the outer periphery of the shaft portion 61b is screwed in a female thread portion 23g formed along the inner periphery of the flange portion 23a of the second axial member 23. With this arrangement, the cover portion 61a of the decorative cover 61 covers an end portion of the lower side of the lock/unlock member 51 in FIG. 3 and also covers the lower side of the second axial member 23 in FIG. 3.

Thus, in the first embodiment, the decorative cover 61 is screwed to the second axial member 23 and becomes a member including a portion positioned on the side opposite to the operation member 41 with respect to the lock/unlock member 51, i.e., herein, becomes a member including the cover portion 61a. The outer periphery of the cover portion 61a of the decorative cover 61 is exposed to the outside, and the user can rotate the decorative cover 61 in the predetermined direction and in the reversed direction about the axis MA by performing the rotating operation through applying the rotating force acting about the axis MA to the outer periphery of the cover portion 61a. With this operation, the decorative cover 61, upon being rotated about the axis MA in the predetermined direction, fastens the lock/unlock member 51 in the direction of the axis MA, herein, in the upward direction in FIG. 3; and the decorative cover 61, upon being rotated in the reversed direction, slackens the fastened lock/unlock member 51.

In the case of unlocking the locked rotation of the operation member 41, after slackening the decorative cover 61, it may be sufficient that the lock/unlock member 51 is slackened. Whereas in the case of locking the rotation of the operation member 41, after fastening the lock/unlock member 51, it may be sufficient that the decorative cover 61 is fastened. Thus, the decorative cover 61 in cooperation with the lock/unlock member 51 realizes a state similar to a double nut, and can further surely prevent the lock/unlock member 51 from being unlocked due to unintentional slackening thereof when the rotation of the operation member 41 is being locked. As a matter of course, according to the present invention, the decorative cover 61 does not necessarily need to be provided but may be removed. In this case, the female thread portion 23g of the second axial member 23 can be utilized as, e.g., a screw for fixing a tripod.

Note that in order to facilitate the rotating operations for the operation member 41, the lock/unlock member 51, and the decorative cover 61, the surfaces thereof may be subjected to knurling and may also be provided with materials such as a rubber exhibiting a high frictional coefficient according to the necessity.

Referring next to FIGS. 8 to 12, an operational example of the binoculars 1 according to the first embodiment will be described. FIGS. 8 to 12 are schematic front views each showing an operational state of the binoculars 1 according to the first embodiment, and correspond to FIG. 2. In these drawings throughout, the interpupillary distance A denotes a maximum interpupillary distance, an interpupillary distance B represents an arbitrary interpupillary distance, and an interpupillary distance C designates a minimum interpupillary distance. Herein, a relationship between these interpupillary distances is given such as $A \geq B \geq C$. It is to be noted that for facilitating the understanding, in FIGS. 8 to 12, the lens barrel 2R and the interconnecting member 21R are illustrated as being fixed in the same direction in these drawings. It is assumed that the indications of the up/down and right/left in the following description correspond to the up/down and right/left in FIGS. 8 to 12.

Figure 8:
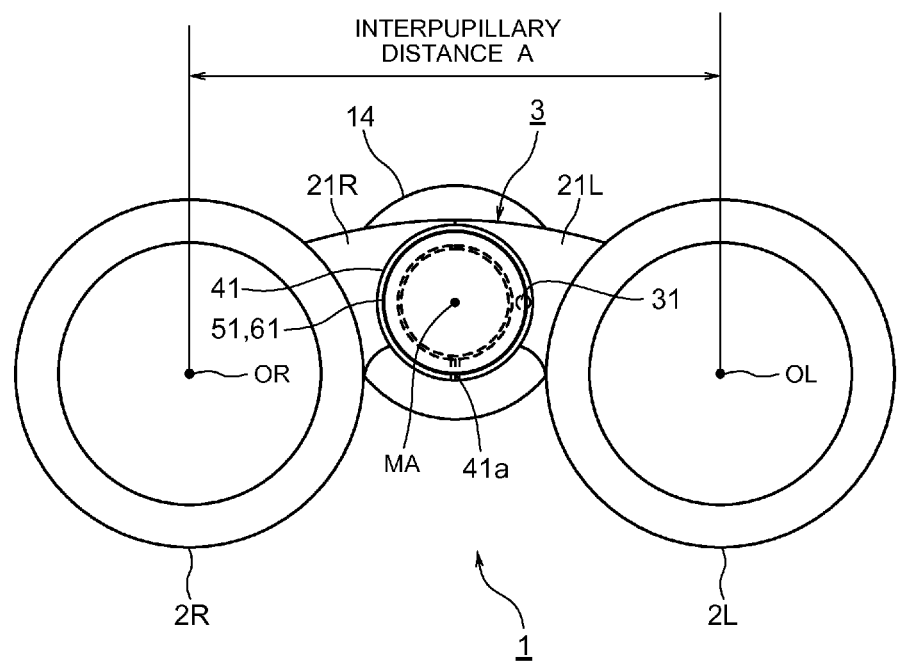
FIG. 8 is a schematic front view showing a predetermined operation state of the binoculars illustrated in FIG. 1.

In the case of setting an interpupillary distance for obtaining a sense of clicking to the interpupillary distance B, to start with, the rotating operation of the operation member 41 is set in an enabled state. Namely, the lock/unlock member 51 is slackened after slackening the decorative cover 61, thereby unlocking the locked rotation, about the axis MA, of the operation member 41 with respect to the lens barrel 2R, the interconnecting member 21R and the first and second axial members 22, 23 and thus setting the rotation of the operation member 41 in the enabled state. FIG. 8 shows an example in which the rotating operation of the operation member 41 is set in the enabled state, in which the interpupillary distance is set to the maximum interpupillary distance A. In the example illustrated in FIG. 8, the V-shaped groove 41a of the operation member 41 is positioned under the axis MA, and the ball 31 provided on the side of the interconnecting member 21L is positioned on the right side of the axis MA.

Figure 9:
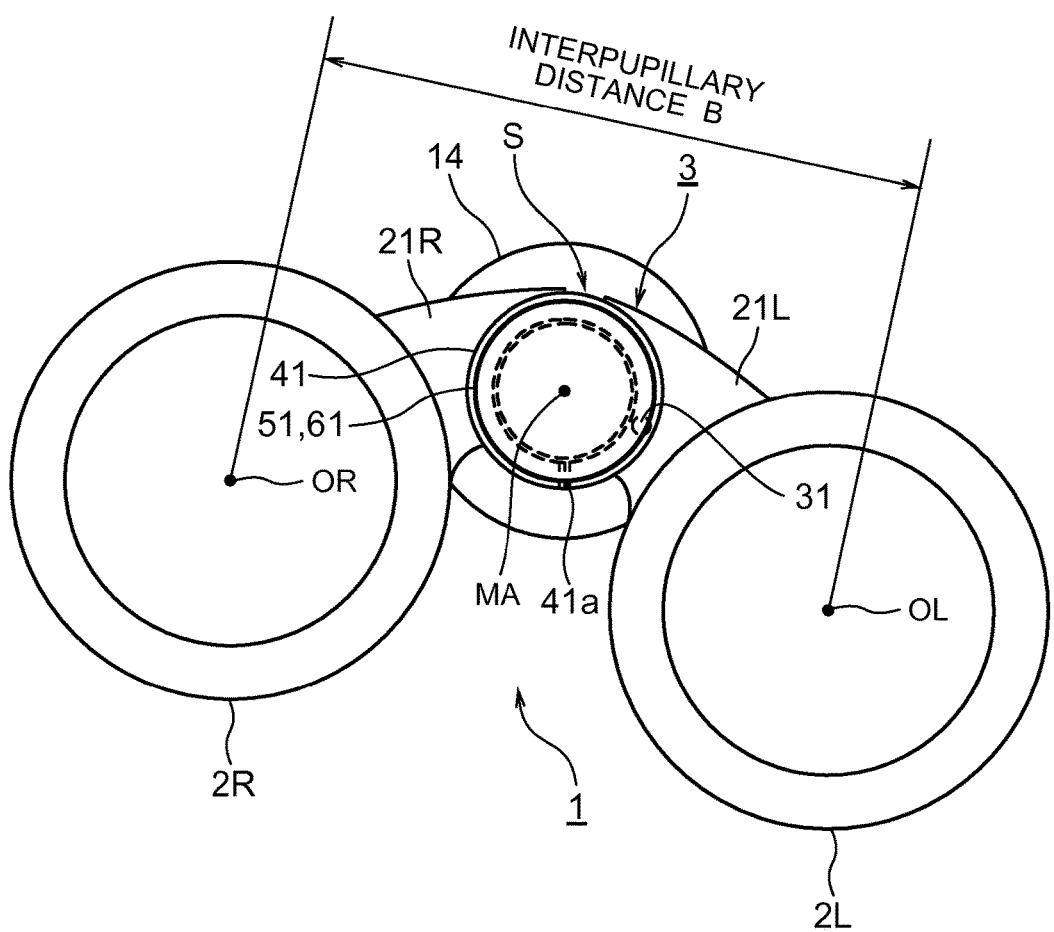
FIG. 9 is a schematic front view showing another operation state of the binoculars illustrated in FIG. 1.

Next, while the rotating operation of the operation member 41 remains in the enabled state, the lens barrels 2R, 2L are rotated relatively about the axis MA, thereby changing the interpupillary distance to the desired interpupillary distance B. FIG. 9 illustrates a state of changing the interpupillary distance to the interpupillary distance B from the state shown in FIG. 8. In FIG. 9, the V-shaped groove 41a of the operation member 41 remains positioned under the axis MA, and, by contrast, the ball 31 provided on the side of the interconnecting member 21L is shifted to a position existing obliquely rightward and downward of the axis MA corresponding to the rotations, about the axis MA, of the lens barrel 2L and the interconnecting member 21L with respect to the lens barrel 2R and the interconnecting member 21R.

Figure 10:
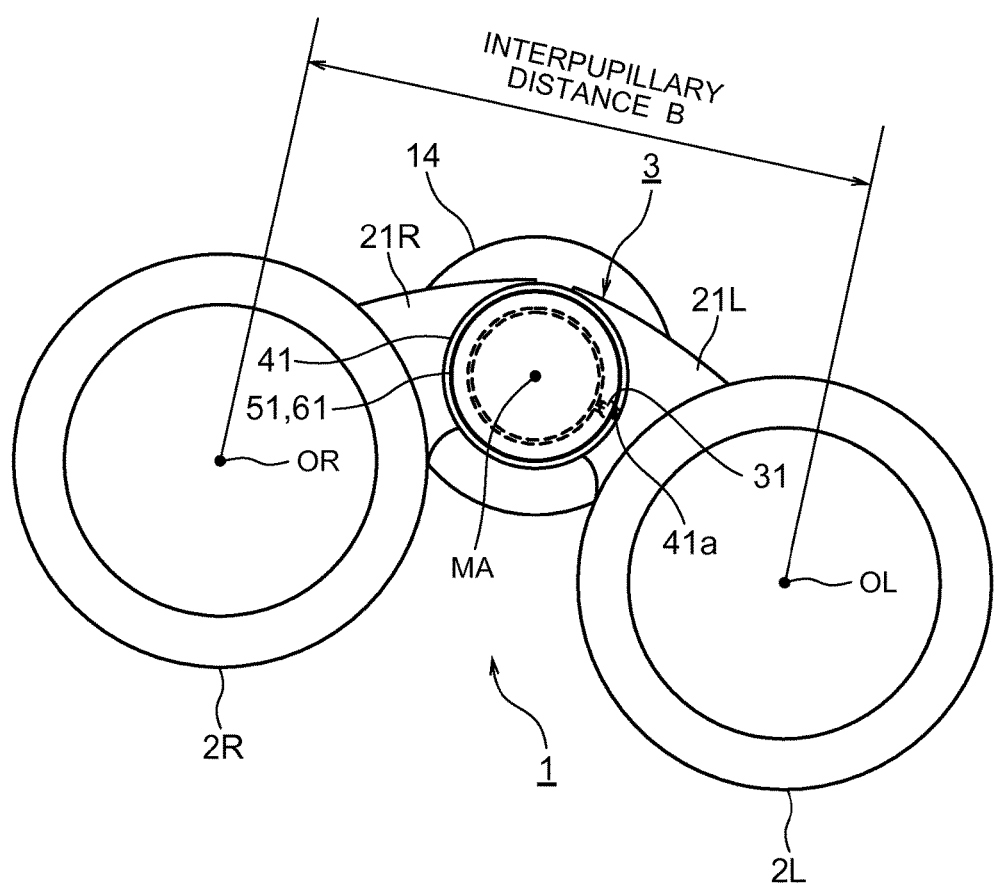
FIG. 10 is a schematic front view showing still another operation state of the binoculars illustrated in FIG. 1.

Thereafter, the rotating operation of the operation member 41 is stopped in the rotating position in which the sense of clicking is obtained by performing the rotating operation of the operation member 41, thereby click-engaging the V-shaped groove 41a of the operation member 41 with the ball 31 provided on the side of the interconnecting member 21L and further locking the rotation of the operation member 41. Namely, the decorative cover 61 is fastened after fastening the lock/unlock member 51, thus the rotation, about the axis MA, of the operation member 41 with respect to the lens barrel 2R, the interconnecting member 21R and the first and second axial members 22, 23 is locked. FIG. 10 illustrates a state in which the V-shaped groove 41a of the operation member 41 brought into the click-engagement with the ball 31 provided on the side of the interconnecting member 21L from the state shown in FIG. 9, and further the rotation of the operation member 41 is locked. In FIG. 10, the ball 31 provided on the side of the interconnecting member 21L remains positioned obliquely rightward and downward of the axis MA, and the V-shaped groove 41a of the operation member 41 is shifted to the same position as that of the ball 31.

The operation of setting the interpupillary distance for obtaining the sense of clicking to the interpupillary distance B terminates so far. In the description made above, the initial state of the setting operation is set in the state where the interpupillary distance is the maximum interpupillary distance A, and may also adopt other arbitrary interpupillary distances.

Figure 11:
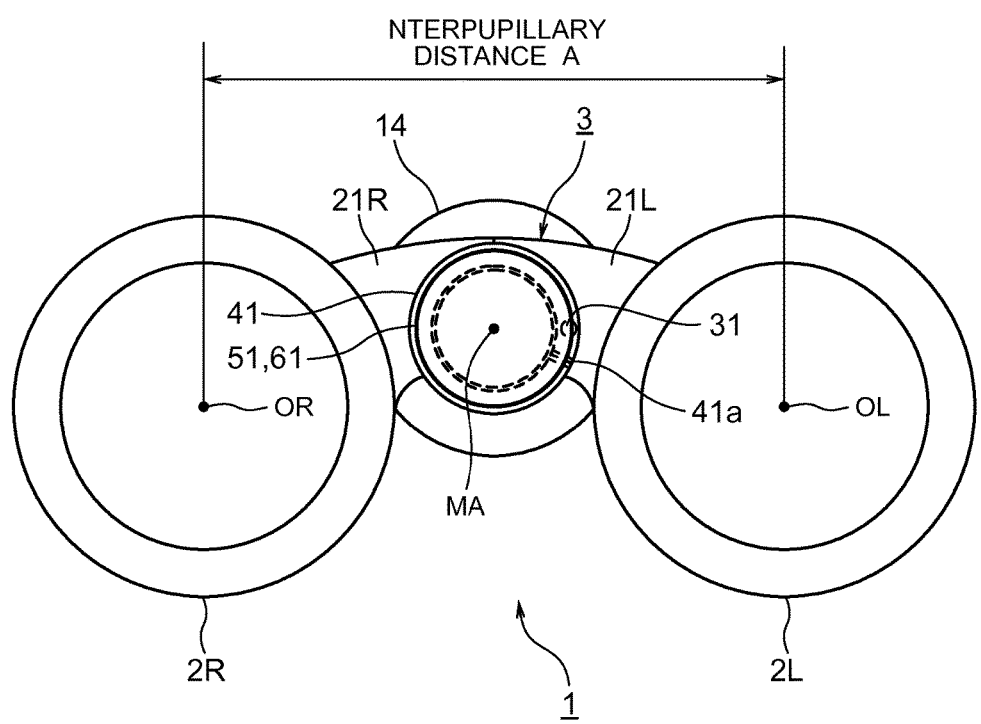
FIG. 11 is a schematic front view showing yet another operation state of the binoculars illustrated in FIG. 1.
Figure 12:
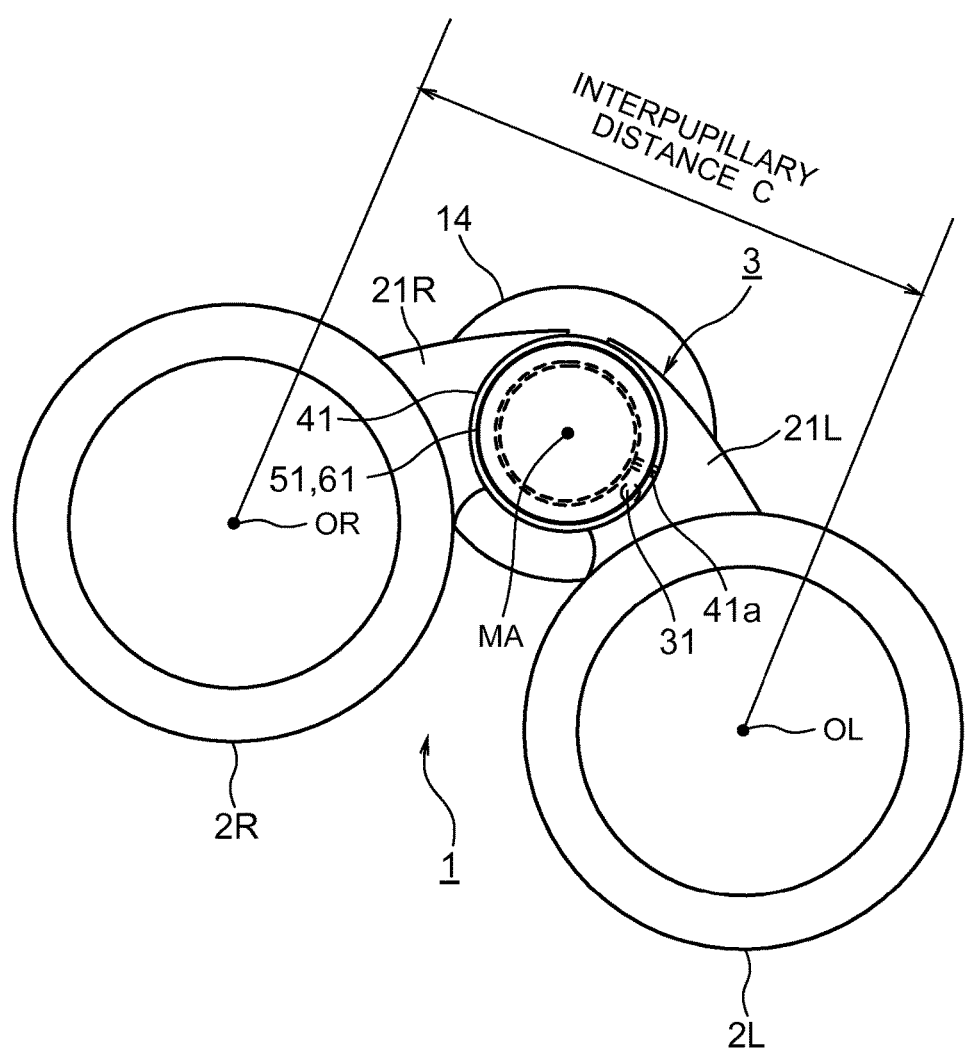
FIG. 12 is a schematic front view showing a further operation state of the binoculars illustrated in FIG. 1.

Even after setting the interpupillary distance for obtaining the sense of clicking to the interpupillary distance B, the interpupillary distance can be changed to another arbitrary interpupillary distance by relatively rotating the lens barrels 2R, 2L about the axis MA. FIG. 11 illustrates a state of changing the interpupillary distance to the maximum interpupillary distance A from the state shown in FIG. 10. In FIG. 11, the position of the V-shaped groove 41a remains the same as in FIG. 10, however, the position of the ball 31 provided on the side of the interconnecting member 21L is shifted to a position on the right side of the axis MA corresponding to the rotations, about the axis MA, of the lens barrel 2L and interconnecting member 21L with respect to the lens barrel 2R and the interconnecting member 21R. FIG. 12 illustrates a state of changing the interpupillary distance to the minimum interpupillary distance C from the state shown in FIG. 10. In FIG. 12, the position of the V-shaped groove 41a remains the same as in FIG. 10, however, the position of the ball 31 provided on the side of the interconnecting member 21L is shifted to a position on the lower side than the V-shaped groove 41a corresponding to the rotations, about the axis MA, of the lens barrel 2L and interconnecting member 21L with respect to the lens barrel 2R and the interconnecting member 21R.

In this way, in the case of returning to the interpupillary distance B at which the sense of clicking has been set after changing the interpupillary distance from the interpupillary distance B, the lens barrels 2R, 2L are rotated relatively about the axis MA in such a direction as to return to the interpupillary distance B, e.g., in a decreasing direction of the interpupillary distance when returning to the interpupillary distance B from the state illustrated in FIG. 11 and in an increasing direction of the interpupillary distance when returning to the interpupillary distance B from the state illustrated in FIG. 12. Thereupon, when reaching the interpupillary distance B, the state shown in FIG. 10 occurs, i.e., the ball 31 drops in the V-shaped groove 41a, resulting in the state of the click-engagement between the ball 31 and the V-shaped groove 41a and thereby obtaining the sense of clicking. Accordingly, the user can simply return the interpupillary distance to the previously arbitrarily set interpupillary distance B.

As described above, according to the first embodiment, it is feasible to arbitrarily set the position of the interpupillary distance at which the sense of clicking is obtained and, besides, the position of the interpupillary distance is changed without canceling the set position.

Then, in the first embodiment, such as when changing to the state illustrated in FIG. 10 from the state shown in FIG. 9, the rotating position of the operation member 41, i.e., the clicking position can be set by rotationally operating the operation member 41 directly. Hence, according to the first embodiment, for setting the rotating position of the operation member 41, there is no necessity for making use of the following movement through the click-engagement as in the case of the binoculars 1 disclosed in Japanese Patent Application Laid-Open Publication No. H11-14893 and, in the first embodiment, the arrangement that the operation member 41 is operated following the rotation of the interconnecting member 21L in the state where the ball 31 engages with the V-shaped groove 41a. Therefore, the first embodiment has no necessity for severely adjusting the frictions of the respective portions and the spring force of the spring 32.

By the way, in the binoculars disclosed in Japanese Patent Application Laid-Open Publication No. H11-14893 described above, the width of the click plate in the increasing direction of the interpupillary distance requires at least the length that is twice as long as the adjustment range of the interpupillary distance, resulting causing a restrain to the adjustment range of the interpupillary distance of the binoculars and causing increases in size both in widthwise direction and in the thicknesswise direction.

In this point, to give a specific description in accordance with the embodiment in Japanese Patent Application Laid-Open Publication No. H11-14893, according to the configuration of Japanese Patent Application Laid-Open Publication No. H11-14893, the "click spring 23" needs to exist on the surface (including the recessed portion 21a) of the "click plate 21" on the side of the click spring within the movement range of the "movable body 15" in the increasing direction of the interpupillary distance.

This means that when considering the state where the "click plate 21" is frictionally seized and restricted from moving in the increasing direction of the interpupillary distance by the "interpupillary distance position lock lever 20", the width of the "click plate 21" in the increasing direction of the interpupillary distance requires the width to the maximum side of the interpupillary distance when the "click spring 23" drops in the "recessed portion 21a" of the "click plate 21" at the minimum interpupillary distance, and the width to the minimum side of the interpupillary distance when the "click spring 23" drops in the "recessed portion 21a" of the "click plate 21" at the maximum interpupillary distance.

Namely, this means that the width of the increasing direction of the interpupillary distance of the"click plate 21" requires at least the length that is twice as long as the adjustment range of the interpupillary distance. For example, in the case of the binoculars that are 56 mm-72 mm in adjustment width of the interpupillary distance as the majority of general binoculars have, it follows that the width of the click plate in the increasing direction of the interpupillary distance needs to be equal to or larger than 32 mm. This leads to the restraint of the adjustment range of the interpupillary distance and to the restraints both in the widthwise direction and in the thicknesswise direction of the binoculars.

In contrast with this, in the binoculars 1 according to the first embodiment, the click position is set depending on the rotating position of the operation member 41, and hence there are increases in terms of degree of freedom about the adjustment range of the interpupillary distance and about the size of the binoculars 1.

Figure 13:
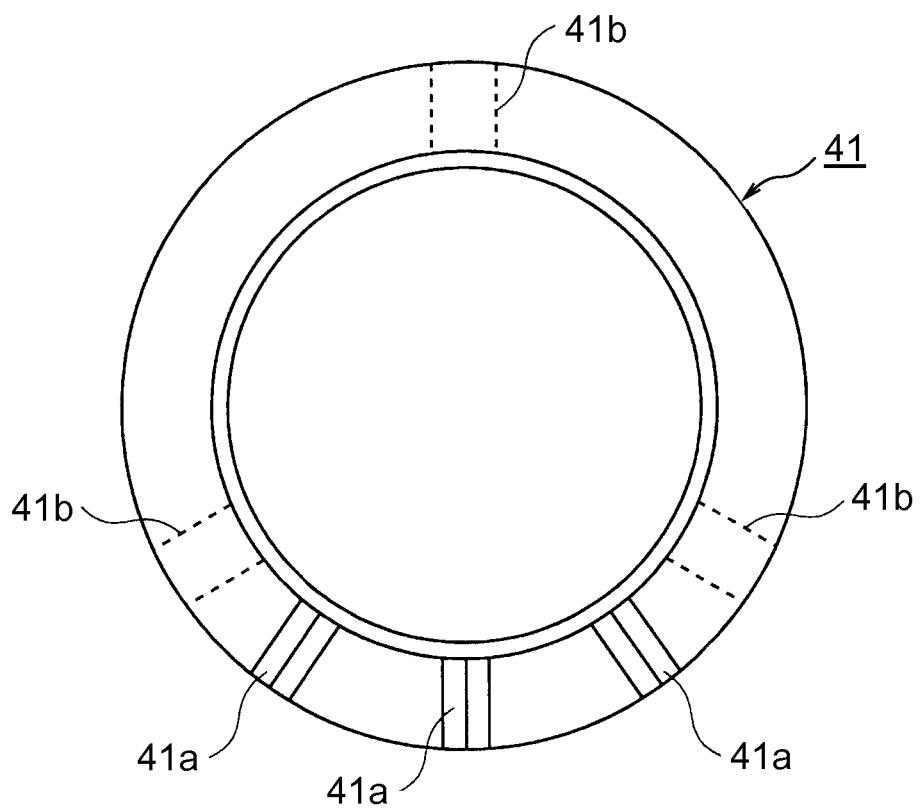
FIG. 13 is a plan view showing a modified example of the operation member.

In the first embodiment, as shown in FIGS. 5 to 7 given above, the operation member 41 is formed with only one V-shaped groove 41a as the recessed portion for clicking. In contrast with this, the operation member 41 may also be formed with a plurality of V-shaped grooves 41a as a plurality of recessed portions for clicking. FIG. 13 is a plan view showing a modified example of the operation member 41, and corresponds to FIG. 5. The number of the V-shaped grooves 41a is not limited, however, in an example illustrated in FIG. 13, the operation member 41 is formed with three V-shaped grooves 41a at proper angle intervals. In this case, for example, the user sets a position from which the sense of clicking is obtained based on the central V-shaped groove 41a as a desired interpupillary distance, and can recognize a warning of being very close to the desired interpupillary distance when obtaining the sense of clicking based on another V-shaped groove 41a. Accordingly, the user can adjust more easily the interpupillary distance to the desired interpupillary distance.

Thus, in the case of forming the plurality of recessed portions for clicking on the operation member 41, the plurality of recessed portions for clicking may be configured so that the sense of clicking through one recessed portion for clicking is different from the sense of clicking through any one of other recessed portions for clicking. For example, in the example illustrated in FIG. 13, the three V-shaped grooves 41a have the same depth and exhibits the same sense of clicking obtained therefrom, however, the sense of clicking based on the central V-shaped groove 41a may also be differentiated from the senses of clicking based on two other V-shaped grooves 41a by setting the depth of the central V-shaped groove 41a deeper than the depths of two other V-shaped grooves 41a. In this case, the sense of clicking related to the warning is different from the sense of clicking related to the desired interpupillary distance, and hence the user becomes easier to distinguish between these two senses of clicking. The user can therefore adjust the interpupillary distance to the desired interpupillary distance much more easily.

Second Embodiment

Figure 14:
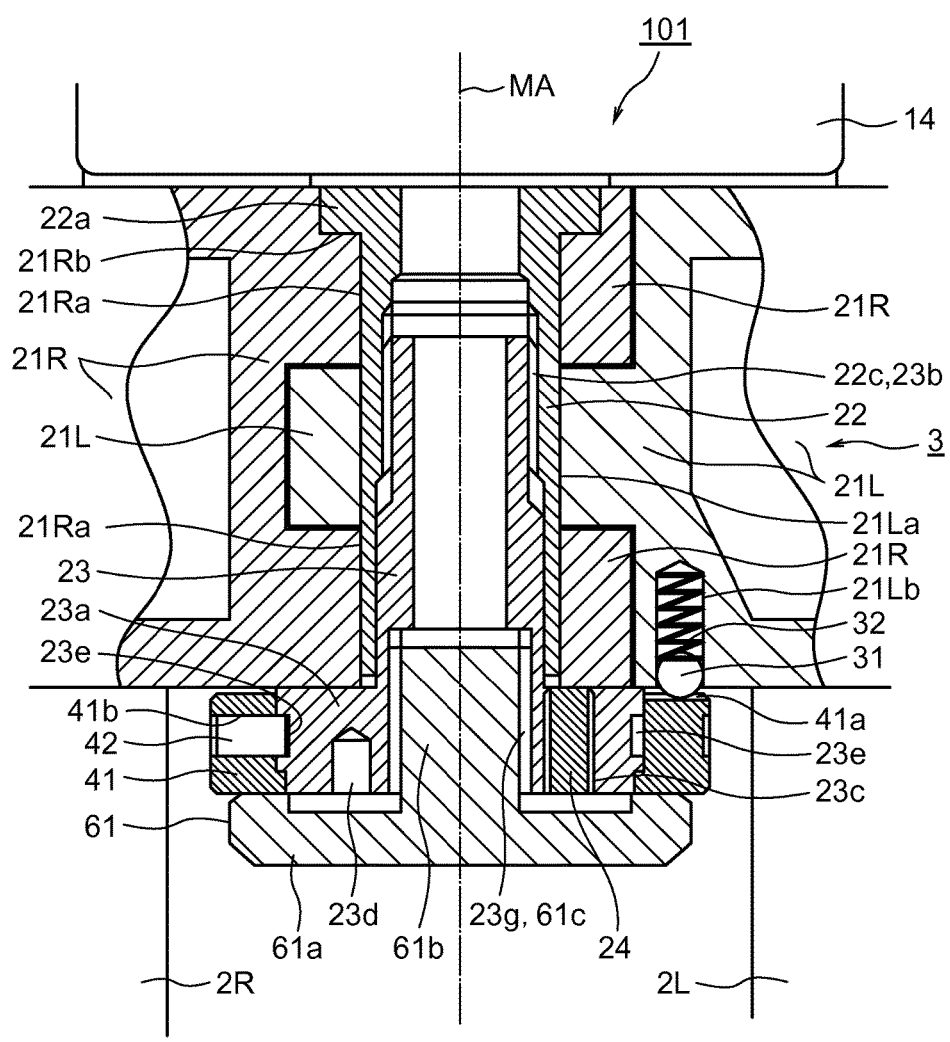
FIG. 14 is a view of portions in the vicinity of the axis MA of the binoculars according to a second embodiment, with these portions being illustrated in enlargement and the majority thereof being illustrated as being broken.

FIG. 14 is a view of portions in the vicinity of the axis MA of binoculars 101 according to a second embodiment, and corresponds to FIG. 3. in FIG. 14, with these portions being illustrated in enlargement and the majority thereof being illustrated as being broken. In FIG. 14, the same or corresponding components as or to those in FIG. 3 are marked with the same numerals and symbols, but their redundant explanations are omitted.

Only a difference between the binoculars 101 according to the second embodiment and the binoculars 1 according to the first embodiment is such a point that the lock/unlock member 51 is removed, and the decorative cover 61 serves as the lock/unlock member.

Namely, in the second embodiment, the decorative cover 61, when rotated in the predetermined direction about the axis MA, fastens the operation member 41 in the direction of the axis MA, herein, in the upward direction in FIG. 14, thus locking the rotation of the operation member 41, i.e., disabling the operation member 41 from rotating; and the decorative cover 61, when rotated in the reversed direction, slackens the fastened operation member 41, thus unlocking the locked rotation of the operation member 41. Namely, the decorative cover 61 enables the operation member 41 to rotate.

The same advantages as those in the first embodiment are acquired from the second embodiment. Note that the operation member 41 may be formed with the plurality of V-shaped grooves 41a also in the second embodiment.

The respective embodiments of the present invention and the modified examples thereof have been described so far, however, the present invention is not limited to those embodiments and the modified examples.

For example, in the respective embodiments described above, the operation member 41 is formed with the V-shaped groove 41a as the recessed portion for clicking, while the ball 31 serving as the protrusion for clicking is provided on the side of the lens barrel 2L; and conversely the protrusion for clicking may be provided on the operation member 41, while the recessed portion for clicking may be provided in the lens barrel 2L.

What is claimed is:

1. Binoculars comprising: an axial member interconnecting first and second lens barrels each having a telescopic optical system to be relatively rotatable, an interpupillary distance being adjusted by relatively rotating said first and second lens barrels about an axis of said axial member, a click position setting mechanism serving to set a click position at an arbitrary angle of rotation of said first and second lens barrels corresponding to an arbitrary interpupillary distance, said click position setting mechanism including a rotating member fitted on an outer peripheral surface of said axial member to be rotatable about the axis of said axial member independently from said first and second lens barrels and facing said first and second lens barrels and a click mechanism that includes a protruded portion being provided on any one of said first lens barrel and said rotating member; a recessed portion being provided on the other of said first lens barrel and said rotating member and being capable of engaging with said protruded portion; and a lock/unlock member locking the rotation of said rotating member with respect to said second lens barrel at a position where said second lens barrel is rotated in accordance with said arbitrary interpupillary distance and unlocking the locked rotation thereof;

wherein said rotating member is disposed apart from both said first and second lens barrels, and engages with a part of said outer peripheral surface of said axial member, thereby regulating a movement of said rotating member toward said first and second lens barrels along the axial direction of said axial member; and said lock/unlock member is screwed to said axial member and is fastened against said rotating member in the axial direction of said axial member so that said lock/unlock member is brought into contact with an end of said rotating member, whereby the rotation of said rotating member is adapted to be locked.

2. The binoculars according to claim 1, wherein a plurality of click positions are provided.

3. The binoculars according to claim 2, wherein at least one click position of the plurality of click positions is different in terms of a sense of clicking from other click positions.

4. The binoculars according to claim 1, wherein said protruded portion protrudes in a direction of said predetermined axis.

5. The binoculars according to claim 1, wherein said protruded portion is configured by a ball biased in a direction of the protrusion by an elastic member.

6. The binoculars according to claim 1, wherein said lock/unlock member serves also as a decorative cover that covers one side of said rotating member in the axial direction.

7. The binoculars according to claim 1, wherein said first and second lens barrels are kept to be relatively rotatable in the state of said lock/unlock member being locked.

8. The binoculars according to claim 1,
wherein said axial member interconnects said first lens barrel to said axial member to be rotatable about said axis, and said second lens barrel to said axial member to be fixed to said axial member.

9. A method for adjusting an interpupillary distance of binoculars that comprise:

an axial member interconnecting first and second lens barrels each having a telescopic optical system to be relatively rotatable, an interpupillary distance being adjusted by relatively rotating said first and second lens barrels about an axis of said axial member, a click position setting mechanism serving to set a click position at an arbitrary angle of rotation of said first and second lens barrels corresponding to an arbitrary interpupillary distance, said click position setting mechanism including a rotating member fitted on an outer peripheral surface of said axial member to be rotatable about the axis of said axial member independently from said first and second lens barrels and facing said first and second lens barrels and a click mechanism that includes a protruded portion being provided on any one of said first lens barrel and said rotating member; a recessed portion being provided on the other of said first lens barrel and said rotating member and being capable of engaging with said protruded portion; and a lock/unlock member locking the rotation of said rotating member with respect to said second lens barrel at a position where said second lens barrel is rotated in accordance with said arbitrary interpupillary distance and unlocking the locked rotation thereof;

wherein said rotating member is disposed apart from both said first and second lens barrels, and engages with a part of said outer peripheral surface of said axial member, thereby regulating a movement of said rotating member toward said first and second lens barrels along the axial direction of said axial member; and said lock/unlock member is screwed to said axial member and is fastened against said rotating member in the axial direction of said axial member so that said lock/unlock member is brought into contact with an end of said rotating member, whereby the rotation of said rotating member is adapted to be locked, said method comprising:

setting the rotating member to be rotatable about said second lens barrel by unlocking the lock/unlock member, setting the first and second lens barrels at an arbitrary angle corresponding to an arbitrary interpupillary distance by rotating the first and second lens barrels relatively, engaging the protruded portion and the recessed portion with each other by rotating the rotating member, and setting the rotating member to be locked about said second lens barrel rotated in accordance with said arbitrary interpupillary distance by locking the lock/unlock member.

* * * * *